United States Patent
Yang et al.

(10) Patent No.: US 9,720,535 B2
(45) Date of Patent: Aug. 1, 2017

(54) PIXEL CIRCUIT AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Haisheng Wang, Beijing (CN); Jingbo Xu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 36 days.

(21) Appl. No.: 14/649,841

(22) PCT Filed: Oct. 15, 2014

(86) PCT No.: PCT/CN2014/088683
§ 371 (c)(1),
(2) Date: Jun. 4, 2015

(87) PCT Pub. No.: WO2015/180373
PCT Pub. Date: Dec. 3, 2015

(65) Prior Publication Data
US 2016/0266688 A1    Sep. 15, 2016

(30) Foreign Application Priority Data

May 30, 2014 (CN) .......................... 2014 1 0240360

(51) Int. Cl.
*G06F 3/041* (2006.01)
*G06F 3/042* (2006.01)
(Continued)

(52) U.S. Cl.
CPC ............ *G06F 3/0412* (2013.01); *G06F 3/041* (2013.01); *G06F 3/042* (2013.01); *G09G 3/3225* (2013.01);
(Continued)

(58) Field of Classification Search
CPC ........ G06F 3/0412; G06F 3/042; G06F 3/041; G09G 3/3659; G09G 3/3225; G09G 2354/00; G09G 2320/045
See application file for complete search history.

(56) References Cited

U.S. PATENT DOCUMENTS

2008/0150848 A1    6/2008   Chung et al.
2011/0001711 A1*   1/2011   Choi ...................... G06F 3/042
                                                                    345/173
(Continued)

FOREIGN PATENT DOCUMENTS

CN    103325341 A    9/2013
CN    103325342 A    9/2013
(Continued)

OTHER PUBLICATIONS

Feb. 26, 2015—(WO) Written Opinion of ISA—Intl App PCT/CN2014/088683—English Translation.
(Continued)

*Primary Examiner* — Matthew Sim
(74) *Attorney, Agent, or Firm* — Banner & Witcoff, Ltd.

(57) ABSTRACT

A pixel circuit and a display apparatus, the pixel circuit comprises a pixel compensation module, a light emitting module and a touch detection module. By integrating the pixel compensation module and the touch detection module into the pixel circuit, and making the pixel compensation module and the touch detection module share data voltage lines and scan signal lines, a number of signal lines can be reduced, so that a size of space between pixels can be
(Continued)

decreased greatly and a cost of an IC is also reduced, which can achieve a higher pixel density.

16 Claims, 9 Drawing Sheets

(51) Int. Cl.
    *G09G 3/3225*     (2016.01)
    *G09G 3/36*     (2006.01)

(52) U.S. Cl.
    CPC ..... *G09G 3/3659* (2013.01); *G09G 2320/045* (2013.01); *G09G 2354/00* (2013.01)

(56) References Cited

U.S. PATENT DOCUMENTS

| | | | |
|---|---|---|---|
| 2011/0169772 A1* | 7/2011 | Liu | G06F 3/0412 345/175 |
| 2015/0049046 A1 | 2/2015 | Tan et al. | |

FOREIGN PATENT DOCUMENTS

| | | |
|---|---|---|
| CN | 103383837 A | 11/2013 |
| CN | 103413524 A | 11/2013 |
| CN | 103456267 A | 12/2013 |
| CN | 203503280 U | 3/2014 |
| CN | 103996377 A | 8/2014 |
| CN | 104036723 A | 9/2014 |
| EP | 1777692 A2 | 4/2007 |

OTHER PUBLICATIONS

Feb. 26, 2015—International Search Report (ISR) Application PCT/CN2014/088683.
Aug. 26, 2015—(CN)—First Office Action Appn 201410240360.9 with English Tran.
Jan. 15, 2016—(CN)—Second Office Action Appn No. 201410240360.9 with English Tran.

* cited by examiner

PIXEL CIRCUIT AND DISPLAY APPARATUS

The application is a U.S. National Phase Entry of International Application No. PCT/CN2014/088683 filed on Oct. 15, 2014, designating the United States of America and claiming priority to Chinese Patent Application No. 201410240360.9, filed on May 30, 2014. The present application claims priority to and the benefit of the above-identified applications and the above-identified applications are incorporated by reference herein in their entirety.

TECHNICAL FIELD

The present disclosure relates to a pixel circuit and a display apparatus.

BACKGROUND

With the rapid progress in a display technique, a display apparatus with a touch function has been gradually applied more and more because of its advantages such as visual operations and the like. The existing display apparatus with the touch function may be generally classified as two kinds of touch panel, that is, an On Cell touch screen panel and an In Cell touch screen panel, according to different relative positions between the touch screen panel and a display screen panel. As compared with the On Cell touch screen panel, the In Cell touch screen panel has a thinner thickness and a higher light transmittance.

For the existing display apparatus, an Organic Light Emitting Diode (OLED), as a current type of light emitting element, has been applied more and more in a high performance display field due to its characteristics of self-luminous, rapid response, wide angle of view, capable of being disposed on a flexible substrate, etc. According to differences in driving manners, the OLED display apparatus may be classified as both kinds of Passive Matrix Driving OLED (PMOLED) and Active Matrix Driving OLED (AMOLED), and the AMOLED is expected to be a next generation of new type flat panel display in place of a Liquid Crystal Display (LCD) due to advantages, such as a low manufacture cost, a high response speed, saving power, being applicable to a direct current driving for a portable device, a wide operation temperature scope and the like. Therefore, the AMOLED display screen panel with the In Cell touch function has been more and more popular.

In the existing AMOLED display panel, each OLED is driven to emit light by means of a driving circuit composed of a plurality of Thin Film Transistors (TFTs) within a pixel cell on an array substrate for display.

Instead, the In Cell Touch Screen Panel (thereafter, referred to as TSP simply) has sensors for touching and the driving circuit manufactured into each pixel cell on the array substrate by means of an array process together. If both of the sensors and the driving circuit of the TSP are overlaid in the pixels of the AMOLED, a certain number of TFTs for the driving circuit needs to be added, such that some space in the pixel cell is occupied additionally. Since left space in the pixel cell is limited, it greatly restricts the simultaneous manufacture of an In Cell TSP circuit and the driving circuit of the AMOLED.

SUMMARY

The present disclosure is directed to provide a pixel circuit and a display apparatus, which are capable of improving an integration level of an In Cell touch circuit and a pixel driving circuit.

In view of this, the present disclosure provides a pixel circuit comprising: a pixel compensation module, a light emitting module and a touch detection module; the pixel compensation module is connected with the light emitting module, the pixel compensation module is connected with a first scan signal line, a second scan signal line, a third scan signal line and a fourth scan signal line; the touch detection module is connected with the second scan signal line and the third scan signal line;

the pixel compensation module is further connected with an operating voltage line and a data voltage line, and is configured to drive, according to inputs from the connected scan signal lines, the light emitting module to emit light and display and eliminate an effect on an operating circuit in the light emitting module caused by a driving threshold voltage; and the touch detection module is further connected with the data voltage line and a touch signal reading line, and is configured to detect a touch signal according to the inputs from the connected scan signal lines and input the detected touch signal to the touch signal read line.

Alternatively, the light emitting module comprises an electroluminescent element connected with the pixel compensation module.

Alternatively, the pixel compensation module comprises a resetting unit, a pixel driving unit and a light emitting control unit;

wherein the resetting unit is connected with the pixel driving unit, and is further connected with the first scan signal line and the second scan signal line, which is configured to reset the pixel driving unit according to the inputs from the connected scan signal lines;

the pixel driving unit is connected with the operating voltage line, a data scan signal line, the second scan signal line, the third scan signal line and the fourth scan signal line, which is configured to amplify a data signal input from a data voltage signal line according to the inputs from the connected scan signal lines and generate a driving current for driving the electroluminescent element to emit light; and the light emitting control unit is connected between the pixel driving unit and the electroluminescent element, and is connected with the third scan signal line, which is configured to transfer the driving current generated by the pixel driving unit to the electroluminescent element according to the input from the third scan signal line.

Alternatively, the resetting unit comprises a second switch element and a fourth switch element; the pixel driving unit comprises a first switch element, a third switch element, a fifth switch element, an energy storage element and a driving and amplifying element; and the light emitting control unit comprises a sixth switch element;

the first switch element is connected between the operating voltage line and an input terminal of the driving and amplifying element, and a control terminal thereof is connected with the fourth scan signal line;

the second switch element is connected between a ground line and a first terminal of the energy storage element, the fifth switch element is connected between a second terminal of the energy storage element and an output terminal of the driving and amplifying element; both control terminals of the second switch element and the fifth switch element are connected with the second scan signal line;

the third switch element is connected between the first terminal of the energy storage element and the data voltage line; the sixth switch element is connected between the driving and amplifying element and the electroluminescent element; both control terminals of the third switch element and the sixth switch element are connected with the third scan signal line;

one terminal of the fourth switch element is connected with the second terminal of the energy storage element, the other terminal thereof is grounded, and a control terminal thereof is connected with the first scan signal line; and a control terminal of the driving and amplifying element is further connected with the second terminal of the energy storage element.

Alternatively, the energy storage element is a first capacitor.

Alternatively, the touch detection module comprises an initialization sub-module, a photo sensing sub-module and an output sub-module; wherein the initialization sub-module is connected between the photo sensing sub-module and the data voltage line, and is connected with the second scan signal line, which is configured to initialize the photo sensing sub-module according to the input from the second scan signal line; the photo sensing sub-module is configured to generate an electrical signal when an intensity of received light varies; the output sub-module is connected between the photo sensing sub-module and the touch signal reading line, and is further connected with the third scan signal line, which is configured to input the electrical signal generated by the photo sensing sub-module to the touch signal reading line according to the input from the third scan signal line.

Alternatively, the photo sensing sub-module comprises a photosensitive transistor and a second capacitor, a first terminal of the second capacitor is connected with the initialization sub-module, a second terminal thereof is connected with the output sub-module and also with the photosensitive transistor to record a threshold voltage of the photosensitive transistor.

Alternatively, the photosensitive transistor is a N-channel type transistor, a source and a gate thereof are connected with the first terminal of the second capacitor, and a drain thereof is connected with the second terminal of the second capacitor.

Alternatively, the initialization sub-module comprises a seventh switch element, the seventh switch element is connected between the first terminal of the second capacitor and the data voltage line, a control terminal thereof is connected with the second scan signal line; the output sub-module comprises an eighth switch element, the eighth switch element is connected between the second terminal of the second capacitor and the touch signal reading line, a control terminal is connected with the third scan signal line.

Alternatively, the initialization sub-module further comprises a ninth switch element, one terminal of the ninth switch element is connected with the first terminal of the second capacitor, a second terminal thereof is grounded, and a control terminal thereof is connected with the first scan signal line.

Alternatively, the driving and amplifying element and the respective switch elements are P-channel type thin film field effect transistors; the control terminal of the driving and amplifying element is a gate of the thin film field effect transistor, the input terminal is a source, and the output terminal is a drain; the control terminals of the respective switch elements are gates of the thin film field effect transistors, and remaining two terminals correspond to sources and drains.

The present disclosure further provides a display apparatus comprising any one of the pixel circuits described above.

Alternatively, the pixel circuit is arranged periodically in the display apparatus.

In the pixel circuit and the display apparatus according to the present disclosure, the pixel compensation module and the touch detection module are integrated in the pixel circuit, and the pixel compensation module and the touch detection module share the data voltage line and the scan signal lines. Thus, a number of signal lines can be reduced, so that a size of space between pixels can be decreased greatly and a cost of an IC is also reduced, which can achieve a higher pixel density.

DETAILED DESCRIPTION

Thereafter, implementations of the present disclosure would be further described in connection with drawings and embodiments. Following embodiments are only used to explain solutions of the present disclosure more clearly, but should not be considered as to limit a scope sought for protection of the present disclosure.

Figure 1:
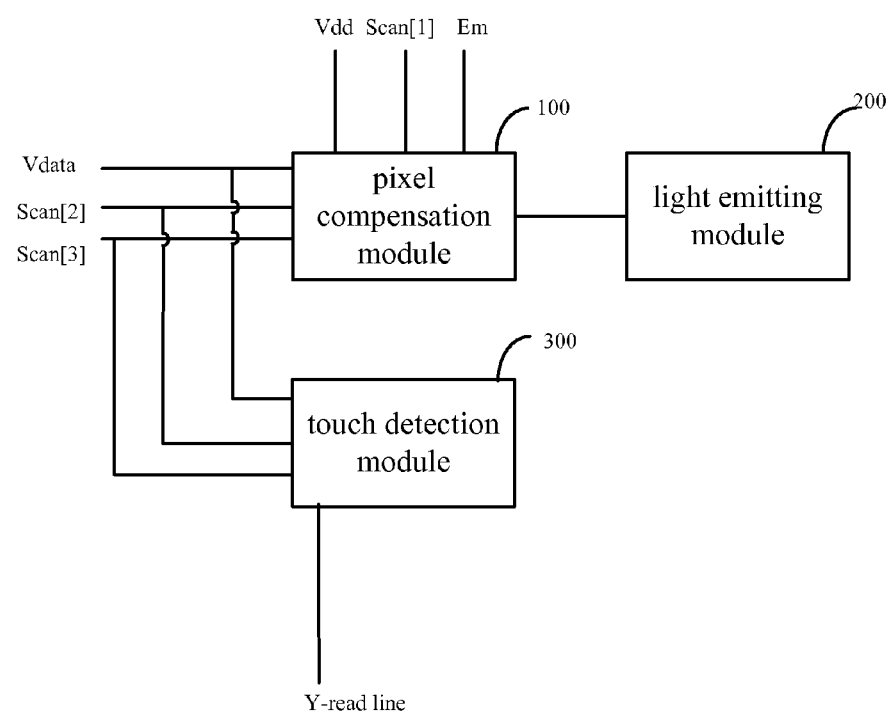
FIG. 1 is a schematic diagram illustrating a structure of a pixel circuit according to embodiments of the present disclosure.

FIG. 1 exemplarily illustrates a structure of a pixel circuit according to the embodiments of the present disclosure. As illustrated in FIG. 1, the pixel circuit comprises: a pixel compensation module 100, a light emitting module 200 and a touch detection module 300. The pixel compensation module 100 is connected with the light emitting module 200, and the pixel compensation module 100 is connected with a first scan signal line Scan[1], a second scan signal line Scan[2], a third scan signal line Scan[3] and a fourth scan signal line EM. The touch detection module 300 is connected with the second scan signal line Scan[2] and the third scan signal line Scan[3].

The pixel compensation module 100 is further connected with an operating voltage line Vdd and a data voltage line Vdata, and is configured to drive the light emitting module 200 to emit light and display, according to inputs from the connected scan signal lines (Scan[1], Scan[2], Scan[3], Scan[4]), and eliminate an effect on an operating circuit in the light emitting module 200 caused by a driving threshold voltage.

The touch detection module 300 is further connected with the data voltage line Vdata and a touch signal reading line Y-read Line, and is configured to detect a touch signal according to the inputs from the connected scan signal lines (Scan[2], Scan[3]) and input the detected touch signal to the touch signal reading line Y-read Line.

In the pixel circuit according to the present embodiment, the pixel compensation module and the touch detection module are integrated in the pixel circuit, and the pixel compensation module and the touch detection module share the data voltage line and the scan signal lines. Thus, a number of signal lines can be reduced, so that a size of space between pixels can be decreased greatly and a cost of an IC is also reduced, which can achieve a higher pixel density.

Figure 2:
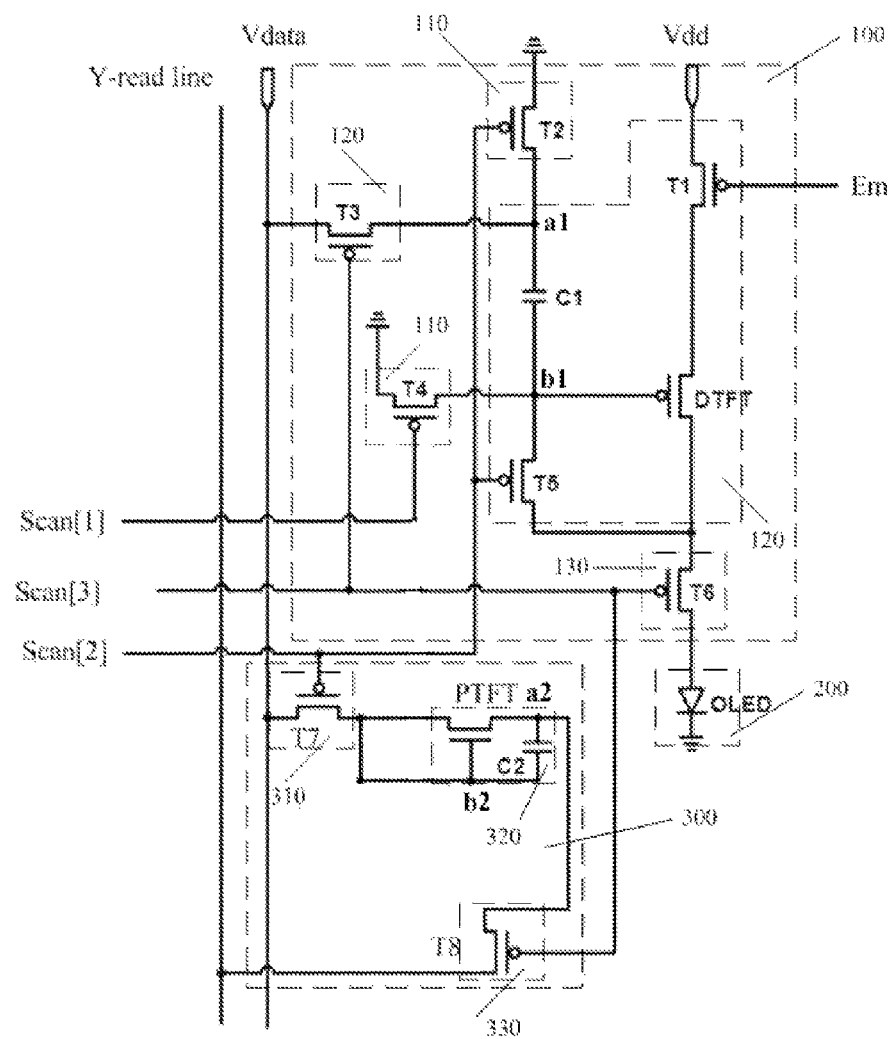
FIG. 2 is a schematic diagram illustrating a circuit structure of a pixel circuit according to the embodiments of the present disclosure.

FIG. 2 exemplarily illustrates a circuit structure of a pixel circuit according to the embodiments of the present disclosure. As illustrated in FIG. 2, the light emitting module 200 may comprise an electroluminescent element OLED connected with the pixel compensation module 100.

In practical applications, the light emitting module may be various current driven type of light emitting elements including a Light Emitting Diode (LED) or an Organic Light Emitting Diode (OLED) in the prior art. In the embodiments of the present disclosure, the description is made by taking the OLED as an example.

For example, as illustrated in FIG. 2, the pixel compensation module 100 may comprise:

a resetting unit 110, a pixel driving unit 120 and a light emitting control unit 130.

In FIG. 2, the resetting unit 110 is connected with the pixel driving unit 120, and is further connected with the scan signal lines Scan[1] and Scan[2], which is configured to reset the pixel driving unit 130 according to the inputs from the connected scan signal lines.

The pixel driving unit 120 is connected with the operating voltage line Vdd, a data scan signal line Vdata and the scan signal lines Scan[2], Scan[3], Scan[4], which is configured to amplify a data signal input from a data voltage signal line Vdata according to the inputs from the connected scan signal lines and generate a driving current for driving the OLED to emit light.

The light emitting control unit 130 is connected between the pixel driving unit 120 and the electroluminescent element, and is connected with the third scan signal line Scan[3], which is configured to transfer the driving current generated by the pixel driving unit 120 to the OLED according to the input from the third scan signal line Scan[3].

Furthermore, as illustrated in FIG. 2, in the pixel compensation module 100, the resetting unit 110 comprises a second switch element T2 and a fourth switch element T4; the pixel driving unit 120 comprises a first switch element T1, a third switch element T3, a fifth switch element T5, an energy storage element C1 and a driving and amplifying element DT; and the light emitting control unit 130 comprises a sixth switch element T6.

A first switch element T1 is connected between the operating voltage line Vdd and an input terminal of the driving and amplifying element DT, and a control terminal thereof is connected with the fourth scan signal line Scan[4].

A first terminal of the second switch element T2 is connected with a first terminal a1 of the energy storage element C1, a second terminal of the T2 is grounded. A first terminal of the fifth switch element T5 is connected with an output terminal of the DT, and its second terminal is connected with a second terminal b of the energy storage element C1. Both control terminals of the T2 and T5 are connected with the second scan signal line Scan[2].

A first terminal of the third switch element T3 is connected with the data voltage line Vdata, and its second terminal is connected with the first terminal a1 of the energy storage element C1. A first terminal of the sixth switch element T6 is connected with the output terminal of the pixel driving unit DT, and its second terminal is connected with the electroluminescent element L. Both control terminals of the third switch element T3 and the sixth switch element T6 are connected with the third scan signal line Scan[3].

A first terminal of the fourth switch element T4 is connected with the second terminal b of the energy storage element C1, its second terminal is grounded, and its control terminal is connected with the first scan signal line Scan[1].

A control terminal of the driving and amplifying element DT is further connected with the second terminal b of the energy storage element C1.

Further, the energy storage element C1 is a capacitor. Of course, in the actual application, any other suitable elements with an energy storage function can also be utilized depending on design requirements.

Further, a photo sensing sub-module 320 comprises a photosensitive transistor PTFT and a second capacitor C2. A first terminal a2 of the second capacitor C2 is connected with an initialization sub-module 310, and its second terminal b2 is connected with an output sub-module 330. Meanwhile, the first terminal a2 of the second capacitor C2 is further connected with a gate of the photosensitive transistor PTFT, its second terminal a2 is further connected with a source of the photosensitive transistor PTFT, to record a threshold voltage of the photosensitive transistor.

Figure 4:
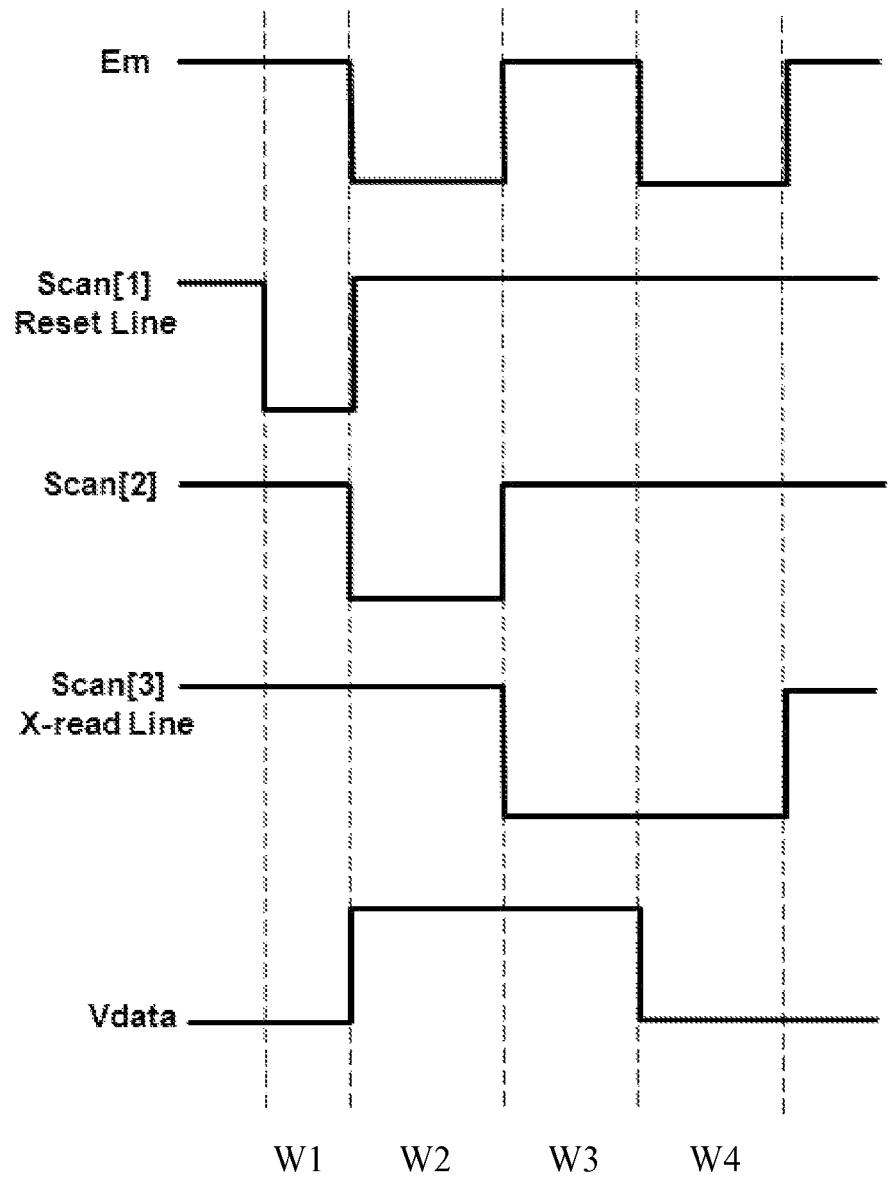
FIG. 4 is a timing diagram illustrating major signals in a driving method for the pixel circuit according to the embodiments of the present disclosure.

Further, as illustrated in FIG. 2 or 4, the photosensitive transistor PTFT is a N-channel type transistor, its drain and gate are connected with the first terminal a2 of the second capacitor, and its source is connected with the second terminal b2 of the second capacitor C2. Of course, in the actual application, the photosensitive transistor can also be a P-channel type transistor, and its corresponding connection manner would not be described in details herein.

Further, as illustrated in FIG. 2, the touch detection module 300 comprises the initialization sub-module 310, the photo sensing sub-module 320 and the output sub-module 330; wherein a first terminal of the initialization sub-module 310 is connected with the data voltage line Vdata, its second terminal is connected with the photo sensing sub-module 320, and its control terminal is connected with the second scan signal line Scan[2], which is configured to set a voltage at the first terminal of the photo sensing sub-module 320 as a voltage on the data voltage line Vdata according to the input from the second scan signal line Scan[2], that is, to initialize the first terminal of the photo sensing sub-module 320. The photo sensing sub-module 320 is configured to generate an electrical signal when an intensity of received light varies. A first terminal of the output sub-module 330 is connected with the second terminal of the photo sensing sub-module 320, its second terminal is connected with the touch signal reading line Y-read Line, and it control terminal is connected with the third scan signal line Scan[3], which is configured to input the electrical signal generated by the photo sensing sub-module 320 to the touch signal reading line Y-read Line according to the input from the third scan signal line Scan[3].

Further, as illustrated in FIG. 2, the initialization sub-module 310 comprises a seventh switch element T7. A first terminal of the seventh switch element T7 is connected with the data voltage line Vdata, its second terminal is connected with the first terminal a2 of the second capacitor C2, and its control terminal is connected with the second scan signal line Scan[2]. The output sub-module 330 comprises an eighth switch element T8. A first terminal of the eighth switch element T8 is connected with the second terminal of the second capacitor C2, its second terminal is connected with the touch signal reading line Y-read Line, and its control terminal is connected with the third scan signal line Scan[3].

Figure 3:
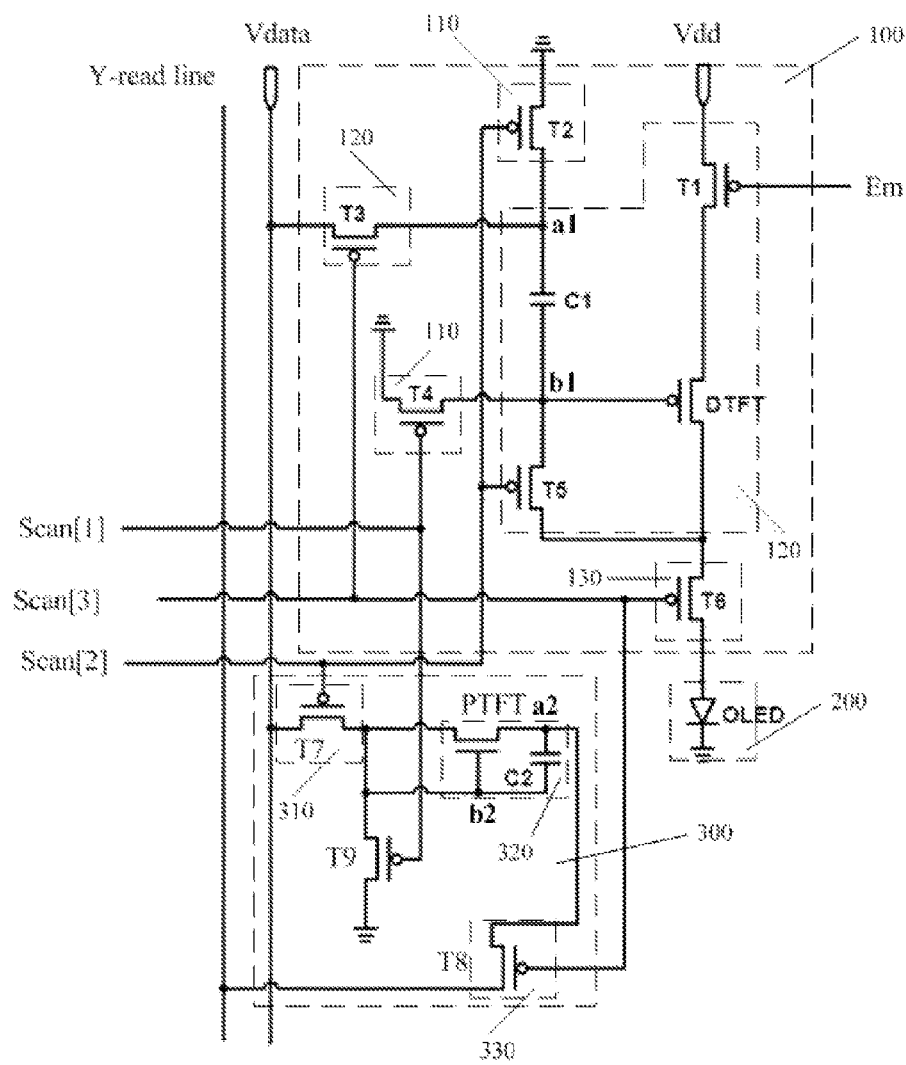
FIG. 3 is a schematic diagram illustrating another circuit structure of a pixel circuit according to the embodiments of the present disclosure.

FIG. 3 exemplarily illustrates a circuit structure of another pixel circuit according to the embodiments of the present disclosure. As illustrated in FIG. 3, on a basis of the pixel circuit shown in FIG. 2, the initialization sub-module 310 in the pixel circuit according to the present embodiment further comprises a ninth switch element T9. A first terminal of the ninth switch element T9 is connected with the first terminal a2 (not shown) of the second capacitor C2, its second terminal is grounded, and its control terminal is connected with the first scan signal line Scan[1].

Thus, during the initialization process, the terminal a2 of the capacitor C2 can be grounded by controlling the ninth switch element T9 to be turned on. Then, a voltage at the terminal a2 of the capacitor C2 is set as the voltage on the data voltage line Vdata. In this way, the initialization of the capacitor C2 is rapider and more thorough.

It is easy to understand that the voltage at the terminal a2 of the capacitor C2 can also be initialized when the data voltage line Vdata is connected to the terminal a2 even if the initialization sub-module 310 dose not comprise T9.

Further, the pixel driving unit DT and the respective switch elements may be P-channel type thin film field effect transistors. At this time, the control terminal of the pixel driving unit is a gate of the corresponding thin film field effect transistor, the input terminal is a source, and the output terminal is a drain. The control terminals of the respective switch elements are gates of the corresponding thin film field effect transistors, and remaining two terminals correspond to sources and drains.

By utilizing the same type of transistors, uniformity of processes can be achieved, so that a yield rate of products can be increased. Those skilled in the art can understand that, the types of the respective transistors may be not same in the actual application, for example, the T2, T5 and T7 may be the N-channel type transistors, while the T3, T6 and T8 may be the P-channel type transistors. As long as two switch elements whose control terminals are connected with the same scan signal line has a same turn-on/turn-off state, the solutions according to the present disclosure can be implemented. Alternative implementations of the present disclosure should not be constructed as limitations on the protection scope of the present disclosure.

FIG. 4 illustrates timings of major signals in a driving method for the pixel circuit according to the embodiments of the present disclosure. FIGS. 5a-5d exemplarily illustrates current flow directions and voltage values in the pixel circuit under the different timings according to the embodiments of the present disclosure. Operation principles of the pixel circuit shown in FIG. 3 would be explained in connection with FIG. 4 and FIGS. 5a-5d. For a purpose of convenience, it is assumed that the respective switch elements and the driving unit are the P-channel type TFTs, the energy storage element is a capacitor, and the photosensitive transistor is the N-channel type. FIG. 4 is a timing diagram illustrating the possible scan signals from the respective scan signal lines during one frame when the pixel circuit according to the embodiments of the present disclosure operates. This operation timing may be divided into four phases, which are denoted as the first phase W1, the second phase W2, the third phase W3 and the fourth phase W4, respectively in FIG. 4. In the respective phases, the current flow directions and the voltage values in the pixel circuit are as shown in FIGS. 5a, 5b, 5c and 5d, respectively.

Figure 5A:
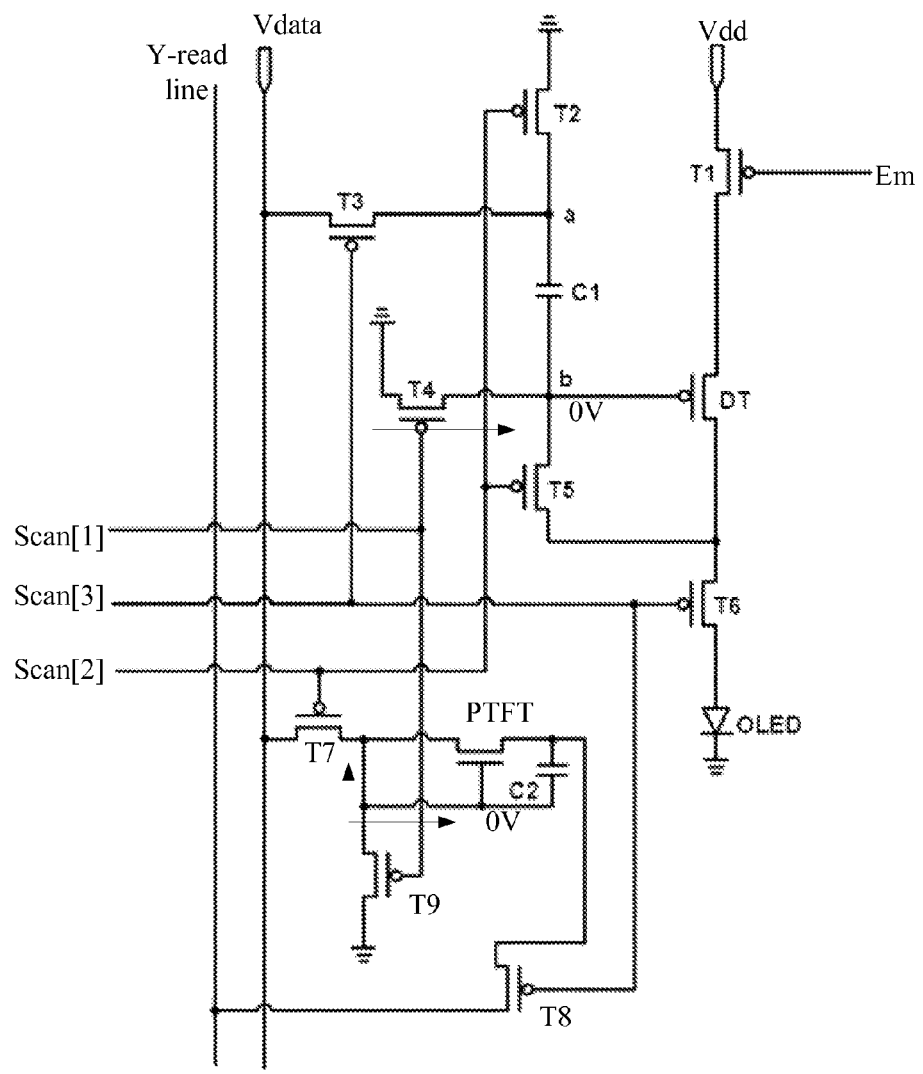
FIGS. 5a-5d are schematic diagrams illustrating current flow directions and voltage values for the pixel circuit under different timings according to the embodiments of the present disclosure.

In the first phase W1, referring to FIG. 4, at this time, the first scan signal line Scan[1] is at a low level and other scan signal lines are at a high level. Referring to FIG. 5a, in the pixel compensation module, only T4 is turned on, at this time a point b1 is reset and grounded, and its potential is 0V, which resets a voltage signal from a previous frame in the capacitor C1. In the touch detection module 300, the T9 is turned on, such that the resetting of the C2 and the photosensitive transistor PTFT is realized, and a potential at the point a2 is 0 after the resetting. It can be seen that the first scan signal line Scan[1] function as a reset scan signal line Reset line for the pixel compensation module and the touch detection module.

Figure 5B:
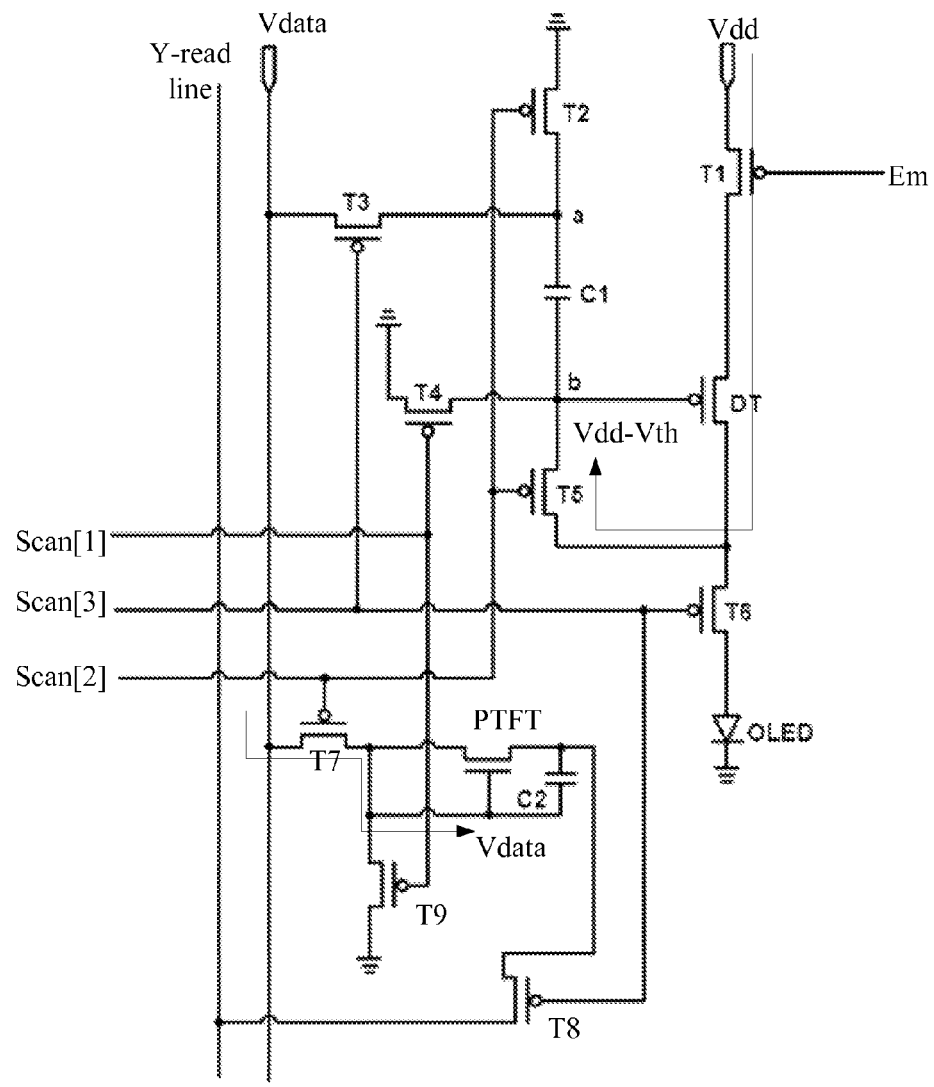

In the second phase W2, Referring to FIG. 4, at this time the second scan signal line Scan[2] and the EM are at the low level while the other scan signal lines are at the high level. Referring to FIG. 5b, in the pixel compensation module, the T1, T2 and T5 are turned on and the T3, T4 and T6 are turned off. Since the point b1 is grounded before, the driving DT is turned on, the Vdd signal starts to charge the point b1 through a path T1→DT→T5 until the point b1 is charged to Vdd−Vth (that is, a voltage difference between the gate and source of the DT is satisfied as being the Vth). During this process, since the point a1 is grounded, and potential thereof is always 0, the potential at the point b1 would be maintained as Vdd−Vth after the charging is completed. Further, since the current would not pass through the OLED because the T6 is turned off, a lifespan loss of the OLED is decreased indirectly.

In the touch detection module, referring to FIG. 5b, the T8 and T9 are turned off, the T7 is turned on. At this time, the data voltage line Vdata sets the voltage at the terminal a2 of the capacitor C2 as the voltage on the data voltage line Vdata (given as Vdata).

Figure 5C:
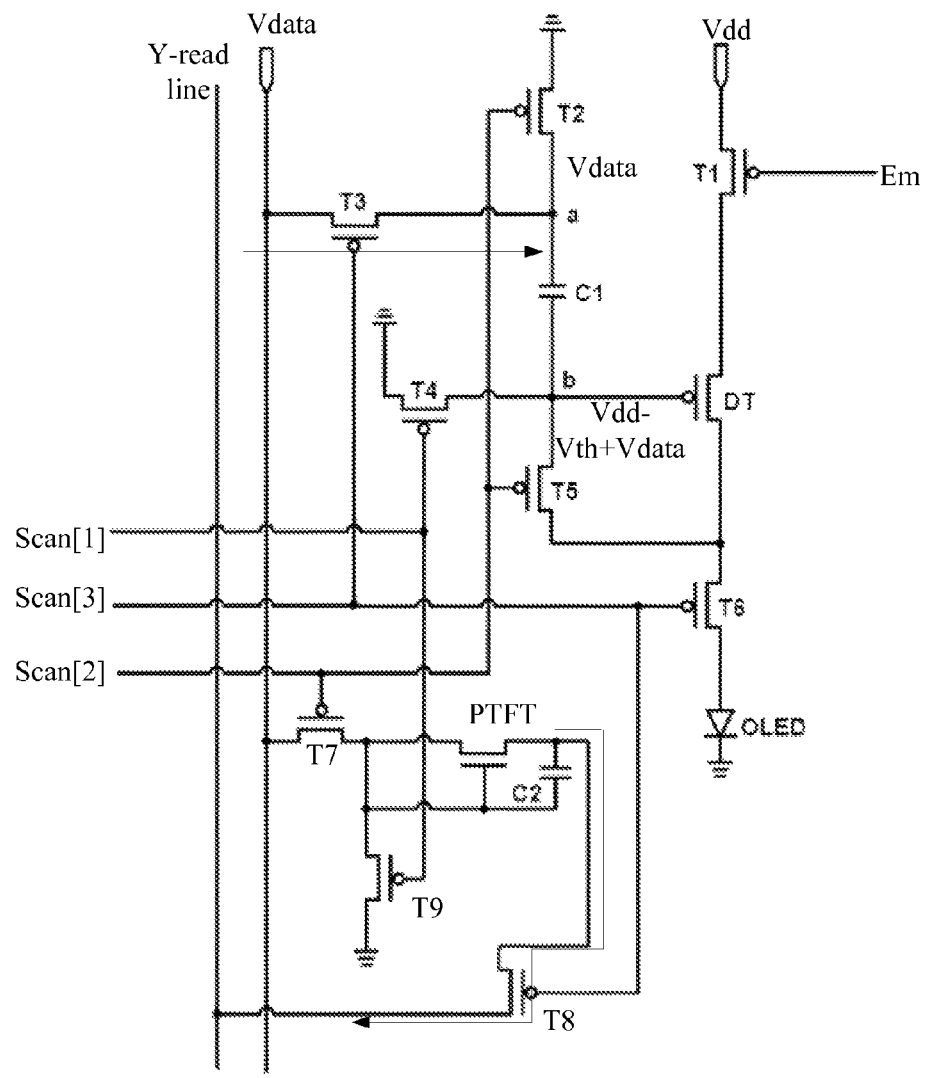

In the third phase W3, as shown in FIG. 4, only the Scan[3] is at the low level while the other scan signal lines are at the high level. As illustrated in FIG. 5c, in the pixel compensation module, the T3 and T6 are turned on at this time, while other TFTs are turned off. At this time, the potential at the point a1 changes to Vdata from 0V, but the point b1 is at a floating state, therefore the potential at the point b1, namely the gate of DT, would jump in a constant voltage in order to maintain the original voltage difference (Vdd−Vth) between the two points a1 and b1. The potential at the point b1 jumps to Vdd−Vth+Vdata to be fixed to prepare for the next phase.

In the touch detection module, referring to FIG. 5c, the T7 and T9 are turned off, the T8 is turned on. At an initial moment during this phase, the PTFT would be turned on because the voltage at the terminal a2 of the capacitor C2 is at the high level Vdata, the capacitor C2 is discharged to the touch signal reading line Y-read Line via the PTFT until the voltage at the terminal a2 drops to Vth' (Vth' is a threshold voltage of the PTFT). In this process, the PTFT may generate a photosensitive current if light irradiates on the photosensitive transistor PTFT, so as to affect the current signal read by the touch signal reading line Y-read Line. Then, it can judge whether the touch occurs at a certain point by amplifying the collected current signal and comparing the amplified current signal with an amplified value of a collected current signal without performing touch. Herein the signal in a Y direction is collected by the Y-read Line, and the Scan[3], as the scan signal in a horizontal direction (X direction), has the collection function per se (because the signal in the Y direction can be collected only when the Scan[3] is at the low level, and the Scan[3] in a special pixel is a low level signal at a special moment, so that a X coordinate can be determined according to the time at which the signal in the Y direction is collected). In this manner, the X, Y coordinates of a position touched by a finger are determined. This process only needs the finger to touch (the intensity of light changes), and the coordinate position can be collected at any moment.

Figure 5D:
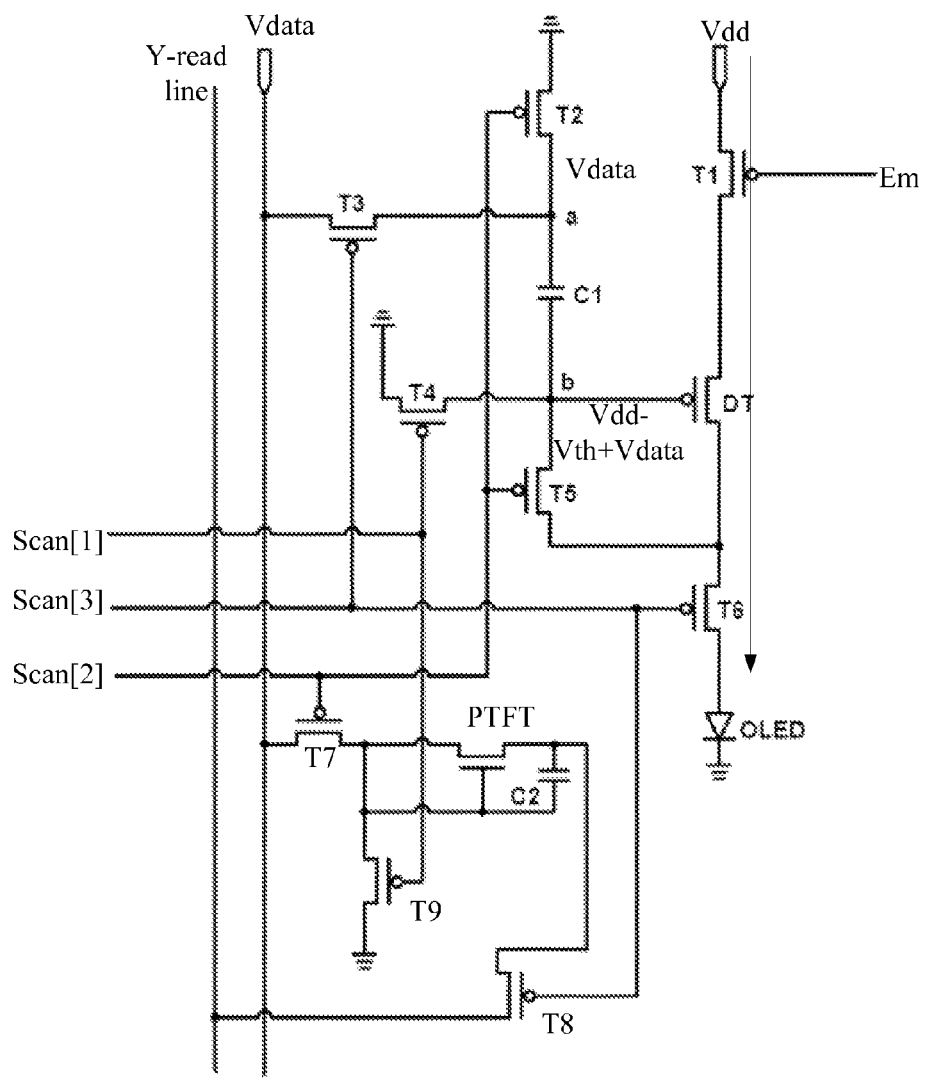

In the fourth phase W4, as illustrated in FIG. 4, the EM and Scan[3] are at the low level while the other scan signal lines are at the high level. As illustrated in FIG. 5d, in the pixel compensation module, the T1, T3 and T6 are turned on at this time while other TFTs are turned off. The Vdd supplies power to the OLED along T1→DT→T6, so that the OLED starts to emit light.

In the touch detection module, only the T8 is turned on at this time while the other switch TFTs are turned off. If the touch occurs at this time, the corresponding current signal can still be read by Y-read Line to determine the position of a touch point.

It can be obtained from a TFT saturation current formula:

$$IOLED=K(V_{GS}-V_{th})^2=K[Vdd-(V_{dd}-Vth+V_{data})-Vth]^2=K(Vdata)^2.$$

It can be seen from the above formula that the operation current $I_{OLED}$ would not be affected by the Vth at this time, which is only associated with Vdata. Thus, a problem of the threshold voltage (Vth) drift of the driving TFT caused by the process and the operation for a long time is settled completely, its effect on the $I_{OLED}$ is eliminated, which can ensure a normal operation of the OLED The embodiments of the present disclosure further provide a display apparatus comprising the pixel circuits in any one of embodiments described above.

Herein, the display apparatus may be a piece of electrical paper, a mobile phone, a tablet, a TV, a display, a notebook computer, a digital photo frame, a navigation machine and any other product or part with the display function.

Alternatively, the pixel circuit is arranged periodically in the display apparatus. In the actual application, it is not necessary to dispose the pixel circuit according to the embodiments of the present disclosure at the position corresponding to each pixel (for example, one pixel circuit according to the embodiments of the present disclosure is disposed in three pixel, and the common pixel circuits are disposed in the other pixels, which can also realize the detection of the touch signal.

Figure 6:
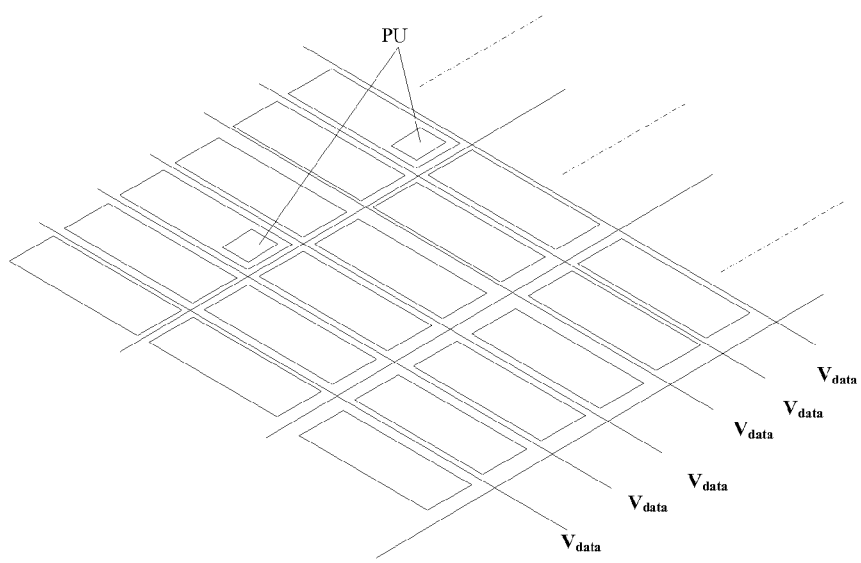
FIG. 6 is a schematic diagram illustrating a position relationship between the pixel circuits and pixels in a display apparatus according to the embodiments of the present disclosure.

FIG. 6 exemplarily illustrates a position relationship between the pixel circuits and the pixels in the display apparatus according to the embodiments of the present disclosure. As illustrated in FIG. 6, as an example, one pixel circuit (PU) according to the embodiments of the present disclosure is disposed per 9 (3×3) pixels.

The foregoing is only illustrative implementations of the present disclosure. It should be noted that for those ordinary skilled in the art, many variations or improvements may be made without departing from the technical principles of the present disclosure, and such variations and improvements fall into the protection scope of the present disclosure.

This application claims priority to a Chinese Patent Application No. 201410240360.9, filed on May 30, 2014, the disclosure of which is incorporated by reference herein as a whole as part of the present application.

What is claimed is:

1. A pixel circuit comprising:
a pixel compensation module, connected with a first scan signal line, a second scan signal line, a third scan signal line and a fourth scan signal line;
a light emitting module, connected with the pixel compensation module; and
a touch detection module, connected with the second scan signal line and the third scan signal line,
wherein the pixel compensation module is further connected with an operating voltage line and a data voltage line, configured to drive, according to inputs from the connected scan signal lines, the light emitting module to emit light for display, and eliminate an effect on an operating circuit in the light emitting module caused by a driving threshold voltage,
wherein the touch detection module is further connected with the data voltage line and a touch signal reading line, and is configured to detect a touch signal according to the inputs from the connected scan signal lines, and input the detected touch signal to the touch signal reading line,
wherein the pixel compensation module comprises a first switch element, a second switch element, a third switch element, a fourth switch element, a fifth switch element, a sixth switch element, an energy storage element and a driving and amplifying element, and wherein
the first switch element is connected between the operating voltage line and an input terminal of the driving and amplifying element, and a control terminal of the first switch element is connected with the fourth scan signal line,
the second switch element is connected between a ground line and a first terminal of the energy storage element, the fifth switch element is connected between a second terminal of the energy storage element and an output terminal of the driving and amplifying element, and both control terminals of the second switch element and the fifth switch element are connected with the second scan signal line,
the third switch element is connected between the first terminal of the energy storage element and the data voltage line, the sixth switch element is connected between the driving and amplifying element and an electroluminescent element, and both control terminals of the third switch element and the sixth switch element are connected with the third scan signal line,
one terminal of the fourth switch element is connected with the second terminal of the energy storage element, another terminal of the fourth switch element is grounded, and a control terminal thereof is connected with the first scan signal line, and
a control terminal of the driving and amplifying element is further connected with the second terminal of the energy storage element.

2. The pixel circuit of claim 1, wherein the touch detection module comprises:
a photo sensing sub-module, configured to generate an electrical signal when an intensity of received light varies;
an initialization sub-module, connected with the second scan signal line, and connected between the photo sensing sub-module and the data voltage line, which is configured to initialize the photo sensing sub-module according to the input from the second scan signal line; and
an output sub-module, connected between the photo sensing sub-module and the touch signal reading line, and connected with the third scan signal line, which is configured to input the electrical signal generated by the photo sensing sub-module to the touch signal reading line according to the input from the third scan signal line.

3. The pixel circuit of claim 2, wherein, the photo sensing sub-module comprises a photosensitive transistor and a second capacitor, a first terminal of the second capacitor is connected with the initialization sub-module, and a second terminal thereof is connected with the output sub-module and also with the photosensitive transistor to record a threshold voltage of the photosensitive transistor.

4. The pixel circuit of claim 3, wherein the photosensitive transistor is a N-channel type transistor, a source and a gate thereof are connected with the first terminal of the second capacitor, and a drain thereof is connected with the second terminal of the second capacitor.

5. The pixel circuit of claim 4, wherein the initialization sub-module comprises a seventh switch element which is connected between the first terminal of the second capacitor and the data voltage line, and a control terminal thereof is connected with the second scan signal line; and the output sub-module comprises an eighth switch element which is connected between the second terminal of the second capacitor and the touch signal reading line, and a control terminal thereof is connected with the third scan signal line.

6. The pixel circuit of claim 5, wherein the initialization sub-module further comprises a ninth switch element, one terminal of the ninth switch element is connected with the first terminal of the second capacitor, a second terminal thereof is grounded, and a control terminal thereof is connected with the first scan signal line.

7. The pixel circuit of claim 5, wherein the driving and amplifying element and the respective switch elements are P-channel type thin film field effect transistors; the control terminal of the driving and amplifying element is a gate of the thin film field effect transistor, the input terminal is a source, and the output terminal is a drain; and the control terminals of the respective switch elements are gates of the thin film field effect transistors, and other two terminals correspond to sources and drains.

8. The pixel circuit of claim 1, wherein the energy storage element is a first capacitor.

9. The pixel circuit of claim 1, wherein, the light emitting module comprises the electroluminescent element connected with the pixel compensation module.

10. A display apparatus comprising the pixel circuits of claim 1.

11. The display apparatus of claim 10, wherein the pixel circuits are arranged periodically in the display apparatus.

12. The display apparatus of claim 10, wherein the touch detection module comprises:
a photo sensing sub-module, configured to generate an electrical signal when an intensity of received light varies;
an initialization sub-module, connected with the second scan signal line, and connected between the photo sensing sub-module and the data voltage line, which is configured to initialize the photo sensing sub-module according to the input from the second scan signal line; and
an output sub-module, connected between the photo sensing sub-module and the touch signal reading line, and connected with the third scan signal line, which is configured to input the electrical signal generated by the photo sensing sub-module to the touch signal reading line according to the input from the third scan signal line.

13. The display apparatus of claim 10, wherein, the light emitting module comprises the electroluminescent element connected with the pixel compensation module.

14. The display apparatus of claim 12, wherein, the photo sensing sub-module comprises a photosensitive transistor and a second capacitor, a first terminal of the second capacitor is connected with the initialization sub-module, and a second terminal thereof is connected with the output sub-module and also with the photosensitive transistor to record a threshold voltage of the photosensitive transistor.

15. The display apparatus of claim 14, wherein the photosensitive transistor is a N-channel type transistor, a source and a gate thereof are connected with the first terminal of the second capacitor, and a drain thereof is connected with the second terminal of the second capacitor.

16. The display apparatus of claim 15, wherein the initialization sub-module comprises a seventh switch element which is connected between the first terminal of the second capacitor and the data voltage line, and a control terminal thereof is connected with the second scan signal line; and the output sub-module comprises an eighth switch element which is connected between the second terminal of the second capacitor and the touch signal reading line, and a control terminal thereof is connected with the third scan signal line.

* * * * *